(12) United States Patent
Sang et al.

(10) Patent No.: US 7,230,991 B2
(45) Date of Patent: Jun. 12, 2007

(54) SCHEDULING METHOD WITH TUNABLE THROUGHPUT MAXIMIZATION AND FAIRNESS GUARANTEES IN RESOURCE ALLOCATION

(75) Inventors: Aimin Sang, Plainsboro, NJ (US); Xiaodong Wang, New York, NY (US); Mohammad Madihian, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 732 days.

(21) Appl. No.: 10/731,962

(22) Filed: Dec. 10, 2003

(65) Prior Publication Data

US 2005/0130664 A1    Jun. 16, 2005

(51) Int. Cl.
*H04K 1/10* (2006.01)
*H04L 27/28* (2006.01)

(52) U.S. Cl. ............... 375/260; 455/450; 370/232; 370/233; 370/234; 370/235

(58) Field of Classification Search ............ 375/130, 375/260; 455/450; 370/230–238
See application file for complete search history.

(56) References Cited

U.S. PATENT DOCUMENTS

| | | | |
|---|---|---|---|
| 6,449,491 B1 | 9/2002 | Dailey | |
| 6,917,812 B2 * | 7/2005 | Damnjanovic | 455/452.2 |
| 2003/0227889 A1 * | 12/2003 | Wu et al. | 370/335 |
| 2004/0266451 A1 * | 12/2004 | Stolyar et al. | 455/452.2 |
| 2005/0063389 A1 * | 3/2005 | Elliott et al. | 370/395.4 |
| 2005/0169301 A1 * | 8/2005 | Jain et al. | 370/464 |

OTHER PUBLICATIONS

3GPP2 C.S0024 Version 3.0, CDMA2000 High Rate Packet Data Air Interface Specification, Dec. 2001.
P. Bender et al., "CDMA/HDR: A Bandwidth-Efficient High-Speed Wireless Data Service for Nomadic Users", IEEE Communications Magazine, pp. 70-77.
3GPP TS 25.308 V 5.2.0 (Mar. 2003) 3rd Generation Partnership Project; Technical Specification Group Radio Access Network; High Speed Downlink Packet Access (HSDPA); Overall description; Stage 2 (Release 5).
M. Grossglauser et al., "Mobility increases the capacity of ad hoc wireless networks", IEEE/ACM Trans. Networking, vol. 10, No. 4, pp. 477-486, Aug. 2.
S.M. Alamouti, "A Simple Transmit Diversity Technique for Wireless Communications", IEEE Journal on Select Areas of Communications, vol. 16, No. 8, Oct. 1998.
G. Foschini, "Layered Space-Time Architecture for Wireless Communication in a Fading Environment When Using Multi-Eleemnt Antennas", Bell Labs Technical Journal, Autumn 1996.

(Continued)

*Primary Examiner*—Jay K. Patel
*Assistant Examiner*—Curtis Odom
(74) *Attorney, Agent, or Firm*—Brosemer, Kolofas & Associates LLC (57) ABSTRACT

A flexible scheduling method with tunable throughput maximization and fairness guarantees in resource allocation is required and suitable for high-rate packet data and other services. Our inventive method, named Alpha-Rule, employs a control variable $\alpha$, that permits dynamic and/or real-time adjustment/tradeoff between aggregate throughput, per-user throughput, and per-user resource allocation. Our method advantageously operates in conjunction with Multiple-Input Multiple-Output techniques such as Space-Time Block Coding (STBC), Bell Labs Layered Space-Time (BLAST) and others, while offering greater flexibility than existing scheduling techniques, e.g., max-C/I or Proportionally Fair (PF).

11 Claims, 4 Drawing Sheets

OTHER PUBLICATIONS

E. Teletar, "Capacity of Multi-antenna Guassian Channels", European Trans. on Telecommunication, vol. 10, No. 6, Nov.-Dec. 1999.

V. Tarokh et al., "Space-Time Block Codes from Orthogonal Designs", IEEE Transactions on Information Theory, vol. 45, No. 5, Jul. 1999.

P.W. Wolniansky et al., "V-BLAST: An Architecture for Realizing Very High Data Rates Over the Rich-Scattering Wireless Channel", ISSSE, Sep. 1998.

G. Foschini et al., "Simplified Processing for High Spectral Efficiency Wireless Communication Employing Multi-Element Arrays", IEEE Journal on Selected Areas in Communications, vol. 17, No. 11, Nov. 1999.

R. Knopp et al., "Information Capacity and Power Control in Single-Cell Multiuser Communications", IEEE 1995.

P. Viswanath et al., "Opportunistic Beamforming Using Dumb Antennas", IEEE Transactions on Information Theory, vol. 48, No. 6, Jun. 2002.

D. Bertsekas et al., "Data Networks—Second Edition", chapter 6—Flow Control.

S. Shenker, "Fundamental Design Issues for the Future Internet", IEEE Journal on Selected Areas in Communications, vol. 13, No. 7, Sep. 1996.

X. Liu et al., "Opportunistic Transmission Scheduling with Resource-Sharing Constraints in Wireless Networks", IEEE Journal on Selected Areas in Communications, 19/10, Oct. 1.

J. Mo et al., "Fair End-to-End Window-Based Congestion Control", IEEE/ACM Transactions on Networking, vol. 8, No. 5, Oct. 2000.

A. Sang et al., "Weighted Fairness Guarantee for Scalable DiffServ Assured Forwarding", IEEE/ICC, Jun. 2001.

F.P. Kelly et al., "Rate Control for Communication Networks: Shadow Prices, Proportioal Fairness and Stability", Journal of the Operational Research Society, vol. 49, Mar. 1998.

* cited by examiner

SCHEDULING METHOD WITH TUNABLE THROUGHPUT MAXIMIZATION AND FAIRNESS GUARANTEES IN RESOURCE ALLOCATION

FIELD OF THE INVENTION

This invention relates generally to the field of wireless communications, and in particular to method(s) for scheduling exhibiting tunable throughput maximization while providing fairness guarantees in resource allocation.

BACKGROUND OF THE INVENTION

High-speed downlink packet data services are of importance to the success of third-generation (3G) and beyond, wireless systems. Examples of such systems include CDMA2000 (see, e.g., 3GPP2 C.S0024 Version 4.0, CDMA2000 High Rate Packet Data Air Interface Specification, December 2001); the High Data Rate (HDR) system which is described in an article entitled CDMA/HDR: a bandwidth-efficient high-speed wireless data service for nomadic users, that was authored by P. Bender et al., and appeared in IEEE Communications Magazine, pp. 70-77 in July 2000; High Speed Data Packet Access (HSDPA) as described in the 3GPP Technical Specification 25.308 version 5.2.0, entitled High Speed Downlink Packet Access (HSDPA): Overall Description, published in March 2002. As is generally known, each of the systems employs Time-Division Multiple Access (TDMA) techniques to provide sharing of a downlink data channel among multiple users.

To facilitate the deployment and effectiveness of such systems, supporting technologies, such as transmission techniques and scheduling methods are being explored and characterized. Specifically, at the physical layer, Multiple-Input Multiple-Output (MIMO) antenna techniques are attractive because they can increase the channel capacity between a base station (BS) and an individual user due, in part, to the spatial (antenna) diversity. At the media access control (MAC) layer, a scheduler within the BS selects users for transmission according to their channel-state-information (CSI) feedback and their measured throughput performance, characterizing their multiuser diversity as was described by M. Grossglauser and D. Tse, in an article entitled "Mobility increases the capacity of ad hoc wireless networks", which appeared in *IEEE/ACM Trans. Networking*, Vol. 10, No. 4, pp 477-486 in August 2002.

As can be appreciated, both types of diversity identified above play a central role in systems that exhibit high throughput and fair resource allocation among users.

Multiple-Input Multiple Output (MIMO) antenna techniques, (see, e.g., S. M. Alamouti, "A Simple Transmit Diversity Technique for Wireless Communications", *IEEE J. Select. Areas Commun.*, vol 16, No. 8, pp. 1451-1458, Oct. 1998; G. J. Foschini, "Layered Space-Time Architecture for Wireless Communication In a Fading Environment When Using Multi-Element Antennas", *Bell Labs Technical Journal*, vol. 1, No. 2, pp. 41-59, Autumn 1996; and I. E. Telatar, "Capacity Of Multi-Antenna Gaussian Channels", *European Trans. On Telecommun.*, vol 10, pp. 585-595, November-December 1999). One of these techniques, Orthogonal Space-Time Block Coding (STBC) was recently adopted for implementation as one of the transmission diversity modes in 3G wireless networks (See, for example, V. Tarokh, H. Jafarkhani, and A. R. Calderbank, "Space-Time Block Codes From Orthogonal Designs", *IEEE Trans. Inform. Theory*, vol. 45, no 5, pp. 1456-1467, July 1999). The STBC technique advantageously achieves "full transmit diversity" and reliable channel(s), however it does not exhibit particular transmission efficiency.

Another technique, the Vertical Bell Labs Layered Space-Time (V-BLAST) technique, which was described in a paper authored by P. Wolniansky, G. J. Foschini, G. D. Golden, and R. A. Valenzuela entitled "V-BLAST: An Architecture For Realizing Very High Data Rates Over the Rich-Scattering Wireless Channel" which appeared in *Proc. Int. Symp. Sig. Sys. Elect.* (ISSSE), in Pisa, Italy in September 1998 and another paper authored by G. J. Foschini, G. D. Golden, R. A. Valenzuela and P. W. Wolniasky entitled "Simplified Processing For High Spectral Efficiency Wireless Communication Employing Multi-Element Arrays", that appeared in *IEEE J. Select. Areas. Commun.*, vol 17, No 11, pp. 1841-1852 and published in November 1999, provides high-rate data transmission but is less reliable during instantaneous deep fades.

Scheduling methods, and in particular scheduling methods for selecting a particular user to whom access to a system should be granted have likewise been the subject of much investigation. More specifically, certain methods grant access to the user that can most efficiently use the system—the one with the best/strongest channel thereby having the highest data rate. In such systems, throughput is maximized at the expense of users using less desirable channels. One such system, was described in U.S. Pat. No. 6,449,491 for Transmitter Directed Code Division Multiple Access System Using Path Diversity To Equitably Maximize Throughput which issued to Chaponniere et al on Sep. 10, 2002, determined an access metric for each user and provided channel access to that user having the greatest access metric.

Alternative scheduling methods have been explored that provide channel access to all users equally—regardless of channel efficiency or throughput. With such systems, the equal access—which may be based on time/duration or volume of transmission—sacrifices overall system efficiency for equality of access.

In addition, methods such as the Maximum Carrier-to-Interference Ratio (max-C/I) scheduling which was described by R. Knopp and P. A. Humbler, in a paper entitled "Information Capacity and Power Control in Single Cell Multiuser Communications", which appeared Proc. *IEEE Int. Conf. Commun.* (ICC), at pp. 331-335, in June 1995; the Proportionally Fair (PF) scheduling method as described in a paper entitled "Data Throughput of CDMA-HDR A High Efficiency-High Data Rate Personal Communication Wireless System", authored by A. Jalali, R. Padovani, and R. Pankaj, that was published in *Proc. IEEE Veh. Technol.* (VTC), at pages 1854-1858 in May 2000; and a paper by P. Viswanath, D. N. C. Tse and R. Laroia, entitled "Opportunistic Beamforming Using Dumb Antennas" that appeared in *IEEE Trans. On Inform. Theory*, vol. 48, No. 6, pp. 1277-1294 in June 2002; and the wired, Max-Min Fair scheduling method as described by D. Bertsekas and R. Gallagar in Data Networks, Chapter 6, published by Prentice-Hall of Englewood Cliffs, N.J. in 1992 all offer particular advantages/disadvantages which characterize their method.

More specifically, each of the above methods differs in the performance of aggregate downlink throughput and the fairness as it relates to per-user time/throughput. Each (except Max-Min Fair) however, is channel-dependent in that they all rely on instantaneous CSI feedback as opposed to the simpler, Round-Robin (RR) scheduling where users are selected independently of channel status.

Accordingly, there exists a continuing need for methods that provide fair access to users of shared wireless systems, while maintaining overall system efficiency. Such method(s) is/are the subject of the present invention.

SUMMARY OF THE INVENTION

We have developed a method that—in sharp contrast to the prior art—provides access to users of a shared wireless system while effectively balancing aggregate throughput and fairness. Our method, which we have named Alpha-Rule, can advantageously migrate between and beyond the throughput/fairness extremes of the prior art Maximum Carrier-to-Interference Ratio (max-C/I) and Proportionally Fair (PF) methods through the use of our inventive control variable, $\alpha$.

Viewed from a first aspect, our invention is directed to a method which determines which one of a plurality of users of a shared network have access to a particular timeslot. Specifically, our inventive Alpha-Rule method determines which user by the following relationship:

$$k^* = \operatorname*{argmax}_{k}\left\{ w_k \frac{r_k(t)}{\tilde{r}_k(t)^\alpha} \right\}$$

Viewed from another aspect, our invention is directed to a further method of adjusting our inventive Alpha-Rule scheduler, utilizing two criteria throughput and fairness which are defined respectively as:

$$r = \sum_{k=1}^{K} \tilde{r}_k$$

and $$F = \frac{\left(\sum_{k=1}^{K} x_k\right)^2}{K \sum_{k=1}^{K} x_k^2},$$

where $x_k$ can be $\tilde{r}_k$ or the per-user percentage (portion) of resource (time-slot) allocation, denoting per-user throughput or resource fairness, respectively.

Our evaluation shows that our inventive Alpha-Rule method compensates for the deficiencies of both PF and max-C/I, thereby producing a more generic and/or flexible scheduling method. Of further advantage, our Alpha-Rule permits real-time performance tuning as control variable a may be dynamically adjusted to a desired system throughput or fairness characteristic(s).

Additional objects and advantages of our invention will be set forth in part in the description which follows, and, in part, will be apparent from the description or may be learned by practice of the invention.

BRIEF DESCRIPTION OF THE DRAWING

Further objects of the invention will be more clearly understood when the following description is read in conjunction with the accompanying drawing and figures in which.

DETAILED DESCRIPTION

Figure 1:
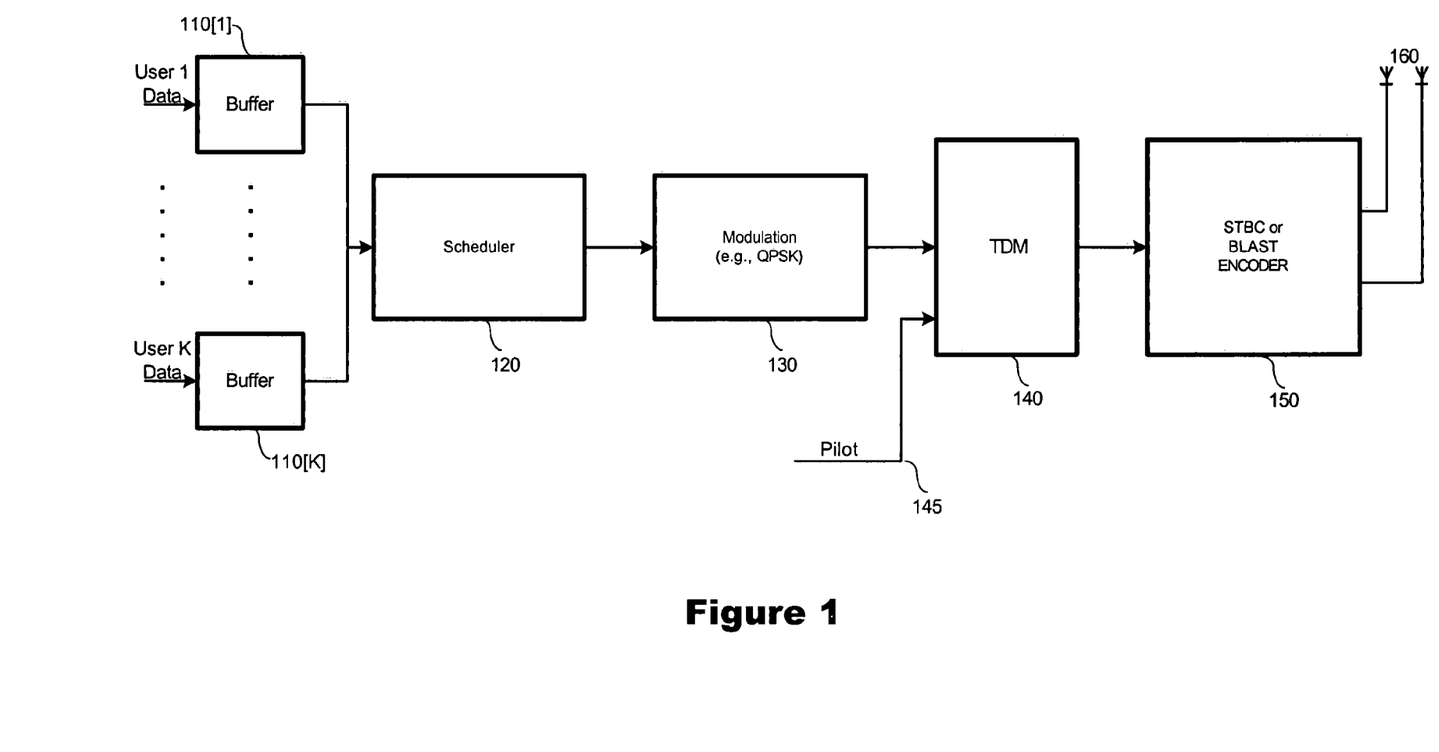
FIG. 1 is a block diagram of a downlink transmitter structure at a base station.
Figure 2:
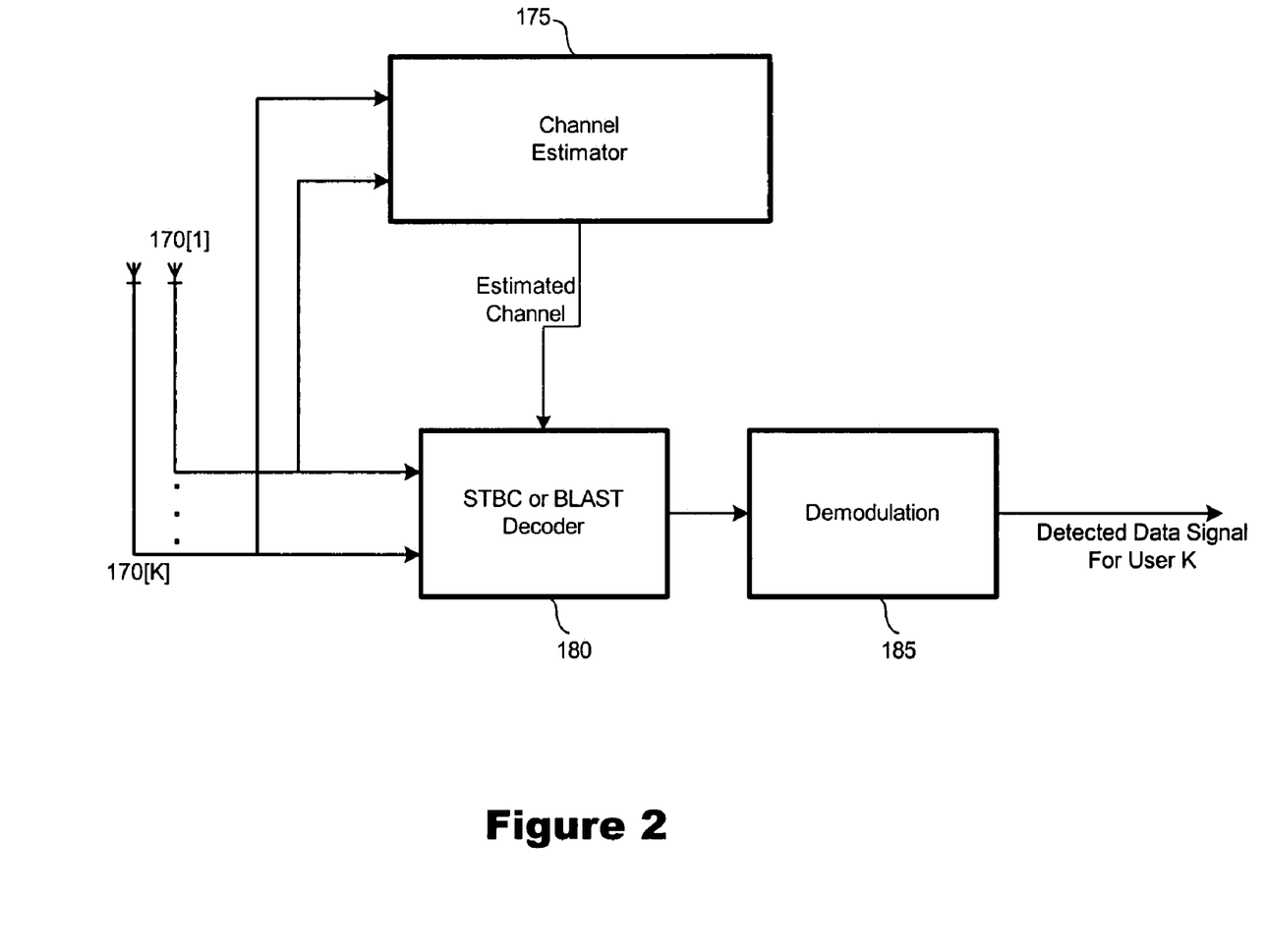
FIG. 2 is a block diagram of a receiver structure at a user terminal.

With reference now to FIGS. 1 and 2, there is shown a block diagram of a high-speed packet cellular system comprising both a Base Station (FIG. 1) and a User Terminal (FIG. 2), which will serve to describe an application of the present invention.

Specifically, and with simultaneous reference to those FIGUREs, shown in therein is a high-speed downlink and corresponding user terminal that may, for example, adopt a STBC or BLAST technique(s). Independent of these schemes, and as shown therein, the system includes $n_T$ transmit antennas and $n_R$ receive antennas. The channel is time slotted and any fading processes between transmitter-receiver pairs, or between the base station and different mobile users, are assumed to be stationary and ergodic.

Returning our attention now to FIG. 1, data bits, from each of the 1 . . . K users, is assumed to be infinite and is buffered at buffers 110[1 . . . K], from which it is subsequently presented to scheduler 120. After an appropriate scheduling methodology is applied by the scheduler 120, the scheduled user data is modulated (for example, by QPSK) at modulator 130, multiplexed by time-division multiplexer (TDM) 140 with pilot signal 145, and subsequently encoded by encoder 150 prior to transmission by antenna array 160. As can be appreciated, the specific modulation, multiplexing, encoding or antenna array is only dependent upon the specific design choice(s) made by the system implementor. Advantageously, our inventive scheduling method is applicable to any of the known modulation, multiplexing, or coding methods known and used in the art.

At the receiver shown in FIG. 2, data transmitted according to the structure shown in FIG. 1 is received by the $\eta_R$ receive antennas, 270[1 . . . K], channel information is determined by channel estimator 275, and the corresponding channelized data is decoded by decoder 280, then demodulated by demodulator 285 prior to presentation to a particular user.

At this point, a mathematical introduction is in order. For the above system(s) of FIG. 1, the received discrete-time signal at the $k^{th}$ terminal out of a total of K such terminals may be modeled by:

$$r_k(t) = \sqrt{\frac{E_s}{n_T}} H_k c_k(t) + n_k(t), \, t = 1, \ldots, T, \quad [1]$$

with $$r_k(t) = [r_{1,k}(t), \ldots r_{n_R,k}(t)]^T;$$
$$H_k = [h_{1,k}^T, \ldots, h_{n_R,k}^T]^T;$$
$$h_{j,k} = [h_{1,j,k}, \ldots, h_{n_T,j,k}^T]^T;$$
$$c_k(t) = [c_{1,k}(t), \ldots, c_{n_T,k}(t)]^T;$$
$$n_k(t) = [n_{1,k}(t), \ldots, n_{n_R,k}(t)]^T;$$

where $c_{i,k}(t)$, $i=1,\ldots,n_T$ is the symbol from transmit antenna i to user k at time slot t;

$E_s$ is the average total transmission energy in one time slot, for example, $\mathrm{tr}(E\{c_k(t)c_k^H(t)\})<E_s$;

$H_k$ is a circularly symmetric complex matrix of dimension $n_R \times n_T$, $h_{ij,k}$ represents the channel gain from transmit antenna i to receive antenna j of the $k^{th}$ user, which is a complex Gaussian random variable with zero mean and variance 0.5 per dimension; and $n_k(t)$ is a complex Gaussian random vector with zero mean and covariance matrix $\sigma_k^2 I$, i.e., $n_k(t) \sim N_C(0, \sigma_k^2 I)$.

Throughout this description of our inventive method, we assume that spatial paths of different transmitter-receiver pairs are independent due to the rich scattering experienced in wireless communications. Stated alternatively, $h_{ij,k}(\forall i,j)$ are independent of each other. In addition, for each complex Gaussian random variable, its real and imaginary parts are also independent and accounts for half of the total variance. For example, the real and imaginary parts of $n_k(t)$ follow $$N\left(0, \frac{\sigma_k^2}{2} I\right).$$

Furthermore, assume that the channel matrix $H_k$ is known to the receiver of each user, but not the transmitter. Accordingly, the instantaneous capacity of the MIMO channel may be written as:

$$R_k(t) = \log\det\left(I_{n_R} + \frac{\rho_k}{n_T} H_k H_k^H\right); \quad [2]$$

Where $$\rho_k \equiv \frac{E_2}{\sigma_k^2}$$

is the mean signal-to-noise (SNR) of user k; $H_k$ is the instantaneous channel state at time t, and the capacity units are bits/s/Hz. To eliminate any confusion, we eliminate the subscript k whenever possible.

With this background theoretical foundation in place, we now turn our attention to our inventive scheduling method. As can be readily appreciated by those skilled in the art, numerous scheduling methods have been proposed for wired networks, but few offer much applicability to the somewhat more complex wireless scenario. The reason(s) for this limited applicability are numerous.

First, the deterministic, fixed bandwidth capacity constraint for users sharing a wired link is replaced by the highly unpredictable wireless channel which exhibits heterogeneous channel statistics for different users. Second, the resources in a wireless network such as the time slots, link capacity and power, are separate and orthogonal resources among different users.

In wired networks in sharp contrast, the sharing of time slots is generally equivalent to the sharing of bandwidth, while power is not much of a concern. Additionally, with wireless scheduling, per-user throughput is not equivalent to per-user (time-slot) resource allocation.

For the purposes of our discussion we only consider the TDM-based downlink scheduling where the downlink channel is time slotted, although our invention is not so limited. Additionally, for the purposes of this discussion, we assume that in each time slot, at most one user can be transmitting, i.e., there is no code multiplexing. With these principles in place, we now introduce our inventive Alpha-Rule method and then demonstrate its generalization to the prior art PF and max-C/I scheme(s).

We begin by first considering a best-effort high-data-rate packet service in a cellular or wireless network. Given the limited resource of time slots, the scheduler at a base station must pick the appropriate user at each slot according to certain rule(s). As can be readily understood, packet transmissions of the selected user will add up to its throughput over time. Accordingly, an exemplary rule would be one that maximizes the sum of some utility functions, or the total "revenue" generated by each user's mean throughput. In light of the network economy for elastic traffic of best-effort services, the utility function would be increasing, strictly concave, and continuously differentiable (see, e.g., S. Shenker, "Fundamental Design Issues For The Future Internet", IEEE J. Select. Areas Commun., Vol. 13, No 7, pp. 1176-1188, September 1995).

Accordingly, the scheduling problem may be formulated into a long-term optimization problem under stationary and ergodic assumptions:

$$\max_{U_k} \sum_{k=1}^{K} U_k(E[r_k(t) 1_{(k^*(t)=k)}]) = \max_{\{\tilde{r}_k\}} \sum_{k=1}^{K} U_k(\tilde{r}_k) \quad [3]$$

where $r_k(t)$ denotes the attainable channel capacity at time slot t; $1_{(k^*(t)=k)}$ is the instantaneous scheduling decision:

$$1_{(k^*(t)=k)} = \begin{cases} 1, & \text{scheduler picks user } k \text{ at slot } t \\ 0, & \text{otherwise.} \end{cases}$$

$\tilde{r}_k = E[r_k(t) 1_{k^*(t)=k}]$ is the stationary expectation of the throughput of user k; $U_k(\tilde{r}_k)$ is the utility function of the mean throughput. The optimization is taken over all possible solution set of $\{\tilde{r}_k\}$, which is determined by the scheduling decision making process under the constraint of picking only one user per time slot:

$$\sum_{k=1}^{K} 1_{(k^*(t)=k)} = 1.$$

Since $r_k(t)$ is upper bounded by the MIMO channel capacity in equation [2], $\tilde{r}_k$ is also upper bounded.

Under the stationary assumption, we can drop the time t in the above, but in practice we have to find the optimal scheduling decision method without knowledge about the future channel. Additionally, the optimal scheduling method would need to solve a stochastic programming issue facing high computational complexity and state explosion given a large number of users. Fortunately, we may advantageously use approximations as follows.

In the time domain, the mean throughput can be estimated by an exponentially weighted moving average of instantaneous channel rate, e.g., $$\tilde{r}_k(t+1) = \left(1 - \frac{1}{t_c}\right)\tilde{r}_k(t) + \frac{1}{t_c}r_k(t)1_{(k^*(t)=k)},$$

where $t_c$ is the exponential filtering factor.

We can see that only the past decision affects the future. Accordingly, we define the asymptotic form of the utility function in optimization as:

$$U \equiv \lim_{t \to +\infty} U(t) \equiv \lim_{t \to +\infty} \sum_{k=1}^{K} U_k(\tilde{r}_k(t)). \quad [4]$$

As an approximation, we take the steepest gradient ascent of U(t) as the optimized direction of the controlled system evolution under the constraint $$\sum_{k=1}^{K} 1_{(k^*(t)=k)} = 1.$$

We now assume that the size of a time slot $\Delta t$ is infinitesimal and $t_c\Delta t$ is kept constant. The TDM-based scheduling then becomes a fluid-flow process of continuous time t. Therefore, we have its derivative in time domain as:

$$\frac{dU(t)}{dt} = \sum_{k=1}^{K} \frac{\partial U_k(\tilde{r}_k(t))}{\partial \tilde{r}_k(t)} \frac{d\tilde{r}_k(t)}{dt} = \sum_{k=1}^{K} \frac{dU_k(\tilde{r}_k(t))}{\partial \tilde{r}_k(t)} \tilde{r}_k(t)'.$$

Recalling the discrete-time $\tilde{r}_k(t)$, we have $$\tilde{r}_k(t + \Delta t) = \left(1 - \frac{1}{t_c}\right)\tilde{r}_k(t) + \frac{1}{t_c}r_k(t)1_{(k^*(t)=k)}.$$

Therefore, $\tilde{r}_k(t)'$ is approximated by:

$$\frac{\tilde{r}_k(t + \Delta t) - \tilde{r}_k(t)}{\Delta t} = \frac{r_k(t)1_{(k^*(t)=k)} - \tilde{r}_k(t)}{t_c \Delta t}$$

It therefore follows that the steepest gradient ascent of $U_t$ at time t is obtained by picking the user k*:

$$k^* = \arg\max_{k} \left\{ \sum_{k=1}^{K} \frac{\partial U_k(\tilde{r}_k(t))}{\partial \tilde{r}_k(t)} \frac{r_k(t)1_{(k^*(t)=k)} - \tilde{r}_k(t)}{t_c \Delta t} \right\} \quad [5]$$

This is our utility-based scheduling rule, where the utility function is defined according to practical requirements. In practice, $r_k(t)$ is the instantaneous "supportable channel rate" fed back to the base station through data rate control (DRC) channel—or other signaling—by individual wireless terminal (k). $\tilde{r}_k(t)$ may be estimated by exponential filtering at the base station. Note further, and in sharp contrast to optimization targets shown by X. Liu, E. K. P. Chong and N. B. Shroff, in a paper entitled "Opportunistic Transmission Scheduling With Resource-Sharing Constraints In Wireless Networks", which appeared in *IEEE J. Select. Areas Commun.*, vol 19, no 10, pp. 2053-2064 in October 2001, in that our utility function depends upon long-term per-user mean throughput whereas Liu et. al. defines an "instantaneous" utility function while trying to maximize the expectations of the total utility under certain long-term time fraction constraints. We maintain that long-term throughput is more relevant to revenue-generation in best-effort services.

To define the utility function according to the economic regulation such as concavity and increasing monotonicity with respect to per-user average throughput, we note certain related strategies adopted in wired (Internet) networks that were described by F. Kelly, A. Maulloo, and D. Tan in an article entitled "Rate Control In Communication Networks: Shadow Prices, Proportional Fairness and Stability", which appeared in the *Journal of the Operational Research Society*, vol. 49, pp. 237-252, in July 1998; and a paper entitled "Fair End-To-End Window Based Congestion Control", authored by J. Mo and J. Walrand in *IEEE/ACM Trans. Networking*, vol 8, no. 5, pp. 556-567, October 2000; and proportional fairness criteria which was proposed and subsequently extended to (p,α) proportionally fair. With this background in place, we may derive our inventive scheduling method(s).

As can be appreciated, among the many fairness criteria associated with link sharing, a popular one is the Max-Min fairness. In terms of our problem, this means the feasible set of mean throughput $\{\tilde{r}_k\}$ of which any user i can not increase its mean throughput $\tilde{r}_i$ without decreasing a smaller or equal $\tilde{r}_j$. An attempt to achieve near-optimum Max-Min fairness among Transmission Control Protocol (TCP) and User Datagram Protocol (UDP) users was made by A. Sang, H. Zhu and S. Q. Li in a paper entitled "Weighted Fairness Guarantee for Scalable Diffserv Assured Forwarding", that appeared in *Proc. IEEE Int. Conf. Commun, (ICC)*, pp. 2365-2369, June 2001. Both fairness criteria attempts to optimize the sum of strictly concave and increasing functions in the form of $$\max_{\{\tilde{r}_k\}} \sum_{k=1}^{K} U_k(\tilde{r}_k),$$

where the optimization constraint is the bottleneck link capacity.

In our notation, the (w,α) proportional fairness dictates that given a positive $w=[w_1, \ldots, w_k]$ and a non-negative α, a vector $\{\tilde{r}_k^*\}$ is (w,α) proportionally fair if under the link sharing capacity constraint it satisfies $$\sum_{k=1}^{K} w_k \frac{\tilde{r}_k - \tilde{r}_k^*}{\tilde{r}_k^{*\alpha}} < 0 \quad [6]$$

for any other non-negative and feasible vector $\{\tilde{r}_k\}$ under the same constraint. It is noted that such a $\{\tilde{r}_k\}$ maximizes the utility function given by $$U_k(\tilde{r}_k) = w_k \frac{\tilde{r}_k^{1-\alpha}}{1-a} \quad [7]$$

where $w_k > 0$, $\alpha \geq 0$, and $U_k(.)$ is a strictly concave and increasing function of $\tilde{r}_k(t)$. Yet in our scenario, there is no static capacity constraint of link sharing among K users, but a constraint on time slot sharing instead. Following our earlier logic, and adopting $$U_k(\tilde{r}_k) = w_k \frac{\tilde{r}_k^{1-\alpha}}{1-\alpha},$$

where $w_k$ is the weight of user k in the total utility, we have the following maximization target:

$$\sum_{k=1}^{K} \frac{w_k}{\tilde{r}_k(t)^\alpha} \frac{r_k(t)1_{(k^*(t)=k)} - \tilde{r}_k(t)}{t_c \Delta t} = \sum_{k=1}^{K} \frac{w_k}{t_c \Delta t} \frac{r_k(t)}{\tilde{r}_k(t)^\alpha} 1_{(k^*(t)=k)} - \sum_{k=1}^{K} \frac{w_k}{t_c \Delta t} \tilde{r}_k(t)^{1-\alpha}$$

Since $\tilde{r}_k(t)$ as the mean throughput before time t is independent of the instantaneous capacity $r_k(t)$ and the scheduling decision $1_{(k^*(t)=k)}$, we can ignore the second part of the above equation. Therefore, the maximization problem transforms into our inventive scheduling method, which as we have indicated prior, we name Alpha-Rule:

$$k^* = \arg\max_k \left\{ w_k \frac{r_k(t)}{\tilde{r}_k(t)^\alpha} \right\} \quad [8]$$

Advantageously, and as can now be readily appreciated by those skilled in the art, by varying the parameters $w_k$ and $\alpha$, we can get a different scheduling result as the circumstances may dictate.

When considering best-effort wireless data services, two metrics characteristic of scheduling performance are of particular importance. Those metrics are throughput and fairness.

Throughput refers to the aggregate scheduling throughput which may be represented by:

$$r = \sum_{k=1}^{K} \tilde{r}_k \quad [9]$$

Fairness, refers to the per-user performance comparison. A fairness index may be defined as:

$$F = \frac{\left(\sum_{k=1}^{K} x_k\right)^2}{K \sum_{k=1}^{K} x_k^2} \quad [10]$$

where $x_k$ denotes the per-user performance measure, such as the per-user time-fraction or per-user mean throughput $\tilde{r}_k$.

As can be appreciated, F is a resource-based (time) or a performance-based (throughput) index, indicative of fairness. It is a continuous function, ranging between 0 and 1. Larger F is indicative of greater or better fairness. In particular, when F=1, the scheduler is completely fair as all $x_k$ are equal. In contrast $$F = \frac{1}{K}$$

is extremely unfair, as only one $x_k$ is nonzero.

To further exhibit the flexibility of our inventive Alpha-Rule, consider the situation when all users are equally weighted, i.e., $w_k=1, \forall k$. In this situation, we have the following special cases of the method.

$\alpha=0$: In this special case, the optimization target becomes $$\max_{\{\tilde{r}_k\}} \sum_{k=1}^{K} \tilde{r}_k.$$

By equation [8], the Alpha-Rule reduces to k*=a max-C/I method described earlier which always picks the user of the best channel and starves the worst-channel users, for example, those who are most remote from the base station. Clearly, this special case maximizes throughput without much consideration to fairness.

$\alpha=1$: In this special case, the optimization target is equivalent to $$\max_{\{\tilde{r}_k\}} \sum_{k=1}^{K} \log \tilde{r}_k.$$

The Alpha-Rule then becomes $$k^* = \arg\max_k \left\{ \frac{r_k(t)}{\tilde{r}_k(t)} \right\},$$

i.e., the Proportionally Fair (PF) scheduling described earlier. Recall, that the PF scheduling picks the user of the best ratio of channel rate to mean throughput. Accordingly, the PF scheduling asymptotically guarantees an equal sharing of time slots among all users, i.e., the resource-based fairness index is around 1.

$\alpha=2$: In this special case the target is to minimize $$k^* = \arg\max_k \left\{ \frac{r_k(t)}{\tilde{r}_k(t)^2} \right\}.$$

As such, the rule minimizes the "potential delay" of all users. In particular, the resultant scheduling policy is represented by $$\sum_{k=1}^{K} \frac{1}{\tilde{r}_k}.$$

With such a rule, users of poorer channels tend to get more time slots in order to reduce the summarized transmission delay of users with equal packet size. As such, the aggregate throughput associated with this special case is lower than PF and even round robin (RR) scheduling.

$\alpha \to \infty$: In this special, extreme case, max-min fairness is achieved in that the scheduler equalizes the throughput of all users. Stated alternatively, the scheduler tends to pick the user associated with the smallest mean throughput at each time slot. Consequently, a significant fraction of time is allocated to users of noisy channels. As should be apparent, this special case exhibits the lowest aggregate throughput of all special cases.

Of further significance in any discussion of our inventive Alpha-Rule is a mention that the weight $w_k$ can be used to differentiate users from different classes, or users in the same class but necessitating per-user requirements for resource sharing and throughput. And while we have assumed for the purposes of our discussion(s) that users of a system utilizing our inventive Alpha-Rule are equally weighted, alternative weighting methodologies would certainly complement our inventive method.

Lastly, as noted before, the $\alpha$ in our inventive Alpha-Rule as described in equation [13] controls the overall scheduling performance and the tradeoff between aggregate throughput and per-user fairness. A larger $\alpha$ provides more time slots to users of weaker channel(s). Consequently, increasing $\alpha$ naturally diminishes the total throughput. Given this monotonic relationship, it should be readily apparent to those skilled in the art that a closed-loop tuning of $\alpha$, based on online or real time measurements of r or F, may produce a desired effect.

Figure 3:
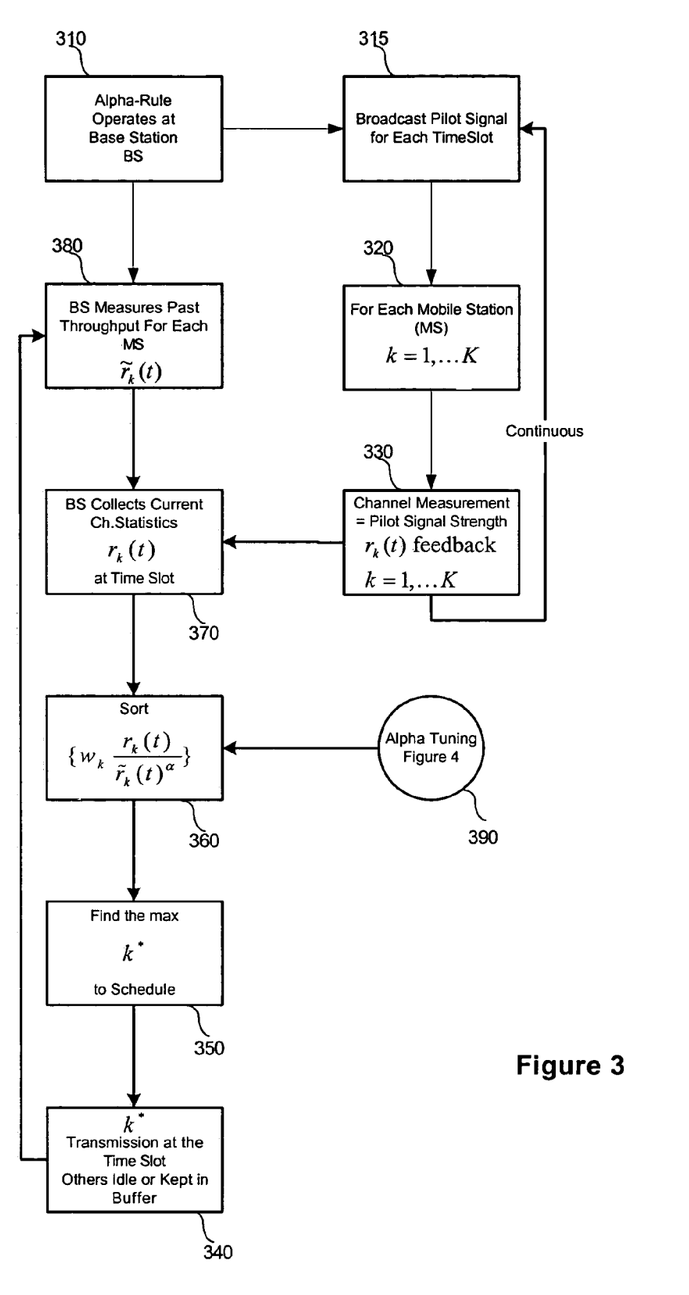
FIG. 3 is a flow chart depicting the operation of our inventive Alpha-Rule method.

Turning our attention now to FIG. 3, there is shown a flow chart depicting our inventive Alpha-Rule method which is the subject of the instant application. Specifically, and with reference to that FIG. 3, it is noted in 310 that our inventive Alpha-Rule operates at a Base Station (BS) or other device which schedules access to a shared network where multiple users are granted access through timeslots.

Continuing, a Base Station (BS) broadcasts a Pilot Signal for each timeslot in block 315 and, for each Mobile Station (MS) k=1, . . . K, in block 320, a channel measurement of the pilot signal strength at each MS for each timeslot is made in block 330, and provided to the channel collecting statistics block of BS by all MSs using feedback channel 370, thereby producing current channel statistics for all mobile stations at a particular timeslot, $r_k(t)$. This sub-process between blocks 315-330, is performed continuously.

At block 380, past throughput for each mobile station is measured at the base station, and then the current channel statistics for each time slot being continuously collected at block 370 are sorted at block 360 according to our inventive Alpha-Rule.

The appropriate MS user is scheduled in block 350 and subsequently transmitted at block 340 while others are kept buffered or idled. This process between blocks 380-340 are continuously repeated as well.

Importantly, our inventive method can be tuned, as depicted by off-chart input block 390, which provides Alpha-Rule updates or tuning.

Figure 4:
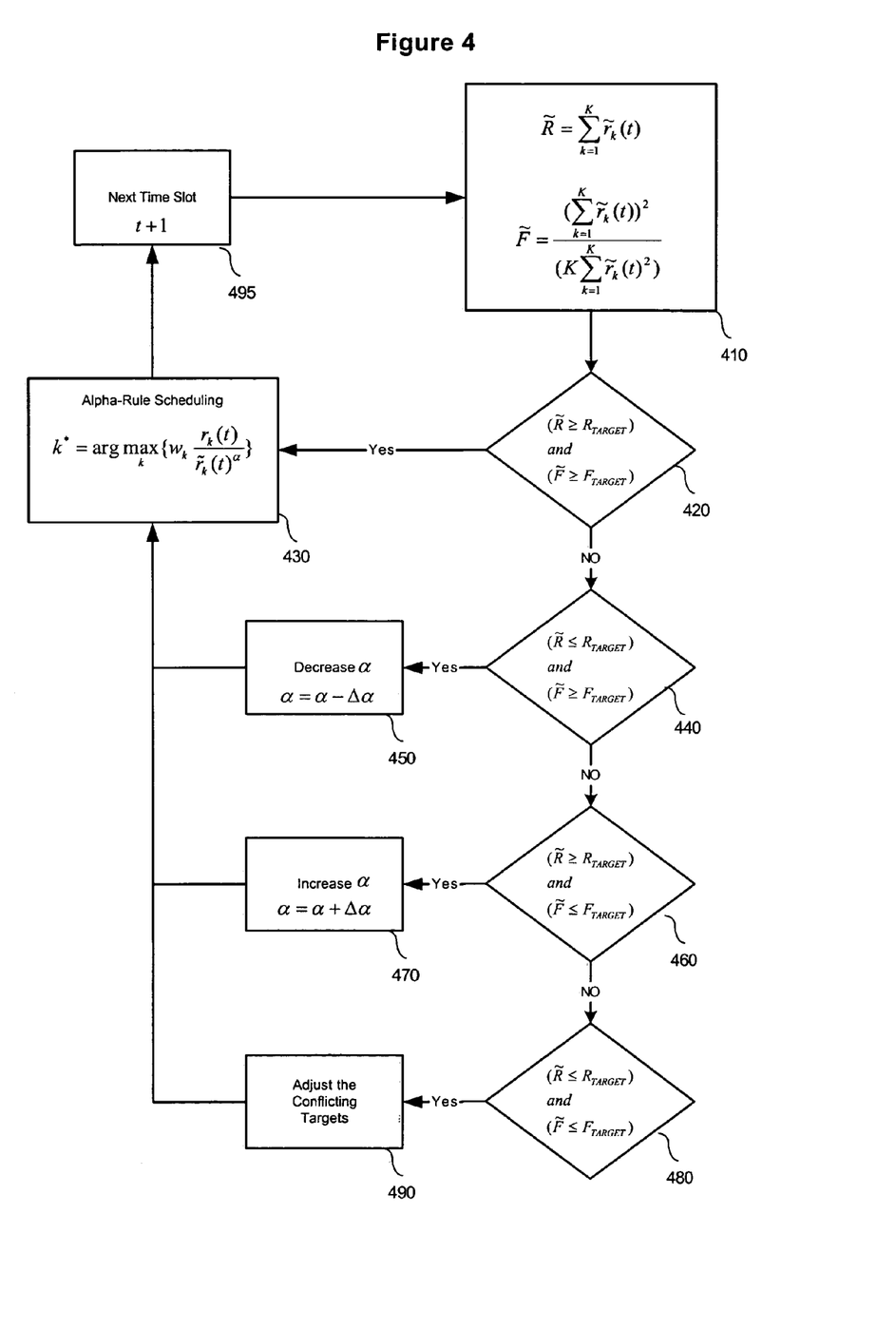
FIG. 4 is a flow chart depicting the tuning of the Throughput and (the exemplary per-user throughput) Fairness parameters of our inventive Alpha-Rule method of FIG. 3.

With reference now to that FIG. 4 the flow chart depicted therein, it is noted as before that two important components to our inventive Alpha-Rule are the throughput and fairness components as identified in block 410. As can be understood by inspection of the FIGURE, if both the throughput and fairness exceed their targets, block 410 directs flow back to block 430, where our inventive Alpha-Rule assigns the user to receive the particular time slot.

If, at block 440, it is determined that the throughput is less than its target and the fairness exceeds its target, Alpha ($\alpha$) is decreased at block 450 and the user for that particular timeslot is again determined at block 430.

If, at block 460, it is determined that the throughput exceeds the target but the fairness does not meet its target, then Alpha ($\alpha$) is increased at block 470 before the user of a particular timeslot is determined at block 430.

Finally, if both the throughput and the fairness do not meet or exceed their targets at block 480, then the targets require adjustment which is performed at block 490. This entire process depicted, is repeated for each of the timeslots as depicted by block 495.

Of course, it will be understood by those skilled in the art that the foregoing is merely illustrative of the principles of this invention, and that various modifications can be made by those skilled in the art without departing from the scope and spirit of the invention, which shall be limited by the scope of the claims appended hereto.

What is claimed is:

1. A method of determining which users, from a plurality of users, access to a communications system is to be provided, such access being provided to the plurality of users over a plurality of channels, the method comprising the steps of:

determining, for each of plurality of channels and for each of the plurality of users, a channel measurement feedback characteristic;

determining, for each of the plurality of channels and for each of the plurality of users, a past throughput characteristic; and determining, a user to be provided access according to the following relationship:

$$k^* = \arg \max_k \left\{ w_k \frac{r_k(t)}{\tilde{r}_k(t)^\alpha} \right\}$$

where
$r_k(t)$ is the channel measurement feedback characteristic of user k;
$\tilde{r}_k(t)$ is the mean throughput of user k;
$w_k$ is a weight applied to each of the users;
$\alpha$ is the Alpha Rule tuning parameter wherein $\alpha \neq 0$ and $\alpha \neq 1$; and k* is the selected user; and determining, a throughput characteristic for the system;
determining, a fairness characteristic for the system; and
adjusting $\alpha$, as a result of the determined throughput characteristic and the determined fairness characteristic; and
comparing, the determined throughput characteristic for the system with a target throughput characteristic; and
comparing, the determined fairness characteristic for the system with a target fairness characteristic.

2. The method according to claim 1 wherein the adjusting step further comprising the steps of:
decrementing $\alpha$, by a predetermined amount, when the determined throughput characteristic for the system is $\leq$ the target throughput characteristic and the determined fairness characteristic for the system is $\geq$ the target fairness characteristic.

3. The method according to claim 1 wherein the adjusting step further comprising the steps of:
Incrementing $\alpha$, by a predetermined amount, when the determined throughput characteristic for the system is $\geq$ the target throughput characteristic and the determined fairness characteristic for the system is $\leq$ the target fairness characteristic.

4. The method according to claim 1 wherein the adjusting step further comprising the steps of:
adjusting the targets, by a predetermined amount, when the determined throughput characteristic for the system is $\leq$ the target throughput characteristic and the determined fairness characteristic for the system is $\leq$ the target fairness characteristic.

5. The method according to claim 1, wherein the throughput characteristic $\tilde{R}$ is determined according to the following relationship:

$$\tilde{R} = \sum_{k=1}^{K} \tilde{r}_k(t)$$

where
$\tilde{r}_k(t)$ is the mean throughput of user k; and K is the total number of users.

6. The method according to claim 1, wherein the fairness characteristic $\tilde{F}$ is determined according to the following relationship:

$$\tilde{F} = \frac{\left(\sum_{k=1}^{K} \tilde{r}_k(t)\right)^2}{\left(K \sum_{k=1}^{K} \tilde{r}_k(t)^2\right)}$$

where
 $\tilde{r}_k(t)$ is the mean throughput of user k; and
 K is the total number of users.

7. The method according to claim 2, wherein $\alpha$ is decremented by a percentage of its present value.

8. The method according to claim 3, wherein $\alpha$ is incremented by a percentage of its present value.

9. The method according to claim 3, wherein the percentage that $\alpha$ is decremented by is between 0% and 100%.

10. The method according to claim 8, wherein the percentage that $\alpha$ is incremented by is between 0% and 100%.

11. The method according to claim 1, wherein the adjusting of $\alpha$ is performed in real-time.

* * * * *